D. H. Hull.
Seed Planter.

No. 64,877.          Patented May 21, 1867.

Witnesses:
Thos Trusche
Wm Trevin

Inventor:
D. H. Hull
Per Munn & Co
Attorneys

United States Patent Office.

D. H. HULL, OF PLANTSVILLE, CONNECTICUT.

Letters Patent No. 64,877, dated May 21, 1867.

---

SEED-PLANTER.

---

*The Schedule referred to in these Letters Patent and making part of the same.*

---

TO ALL WHOM IT MAY CONCERN:

Be it known that I, D. H. HULL, of Plantsville, Hartford county, Connecticut, have invented a new and improved Seed-Planter; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

This invention relates to a seed-planter which can be used for planting corn, cotton, and other kinds of seeds, and which is so arranged that the ploughs and scrapers can be raised out of the ground with ease and facility, and that the same can be let into the ground to any desired depth.

Figure 2:
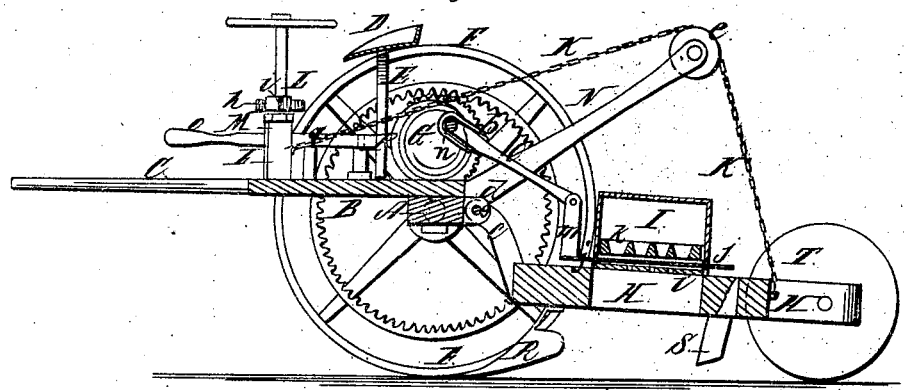
Figure 2 is a vertical longitudinal section of the same, taken on the line $x\ x$, fig. 1.
Figure 1:
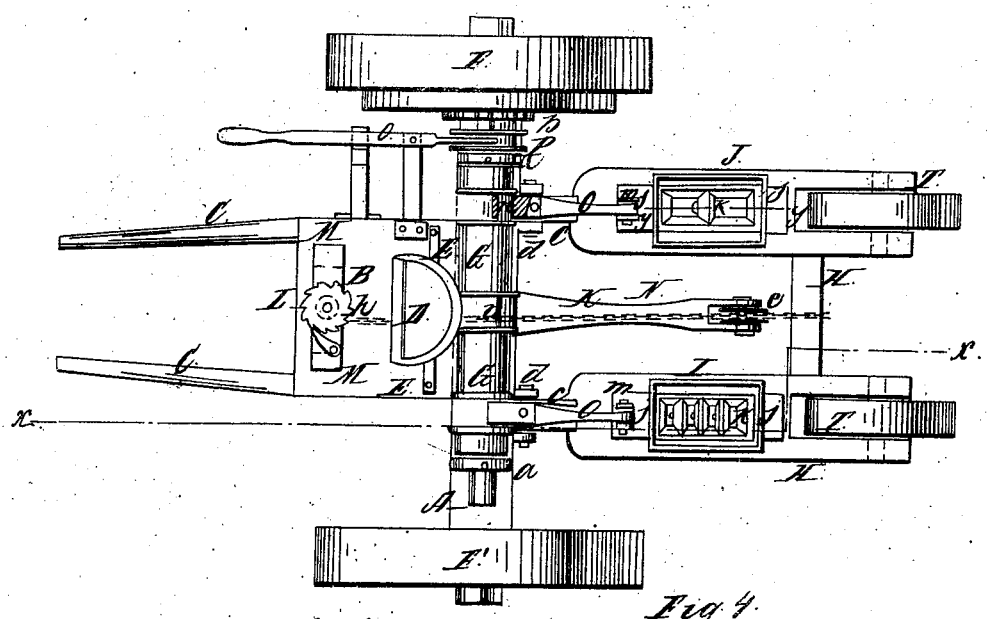
Figure 1 represents a plan or top view of my improved seed-planter.
Figure 3:
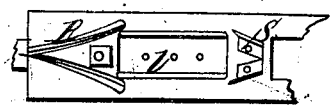
Figure 3 is a detail inverted plan view of the seed-box and scrapers.
Figure 4:
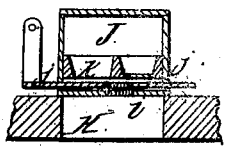
Figure 4 is a detail sectional view through the seed-box, taken on the line $y\ y$, fig. 1.

A represents a stationary axle, which is firmly secured to the under side of a platform, B, and which is connected with the ends of the poles C, as shown. D is the driver's seat, which is supported by braces E, that are secured to the platform B. On the ends of the axle A are hung respectively two wheels, F and F', by which the whole apparatus is supported. G is a horizontal shaft, which is hung in bearings $a\ a$, which are fixed to the upper side of the axle A, said shaft G being thus directly above and parallel with the axle A. The wheel F is provided with internal gear, and meshes into a pinion, $b$, that is hung on the end of the shaft G, as is clearly shown in the drawing. H is a wooden frame upon which the seed-boxes I and J are supported. Any number of such seed-boxes may be arranged on the frame H, but two being shown in the drawings. The frame H is provided at its front with two or more upward projecting lugs, $c\ c$, which are pivoted by means of pins $g$ to ears $d\ d$ which project from the rear of the axle A. K is a chain, of which one end is secured to the back part of the frame A, while its front end is secured to an upright shaft, L, which has its bearings in the platform B, and in a yoke, M, which is secured to the top of the platform. N is a bar which projects upward from the axle A, and to the end of which a friction-pulley, $e$, is fixed, over which the chain K is laid. By turning the shaft L by means of a hand-wheel, $f$, or crank, or other device, the chain will be wound around L, and the rear part of the frame H will thereby be elevated, and turn on the pins $g$, by which it is connected with the axle A. A ratchet-wheel, $h$, which is mounted on the shaft L, and a pawl, $i$, on the yoke M or platform B, serve to hold the shaft, and prevent it from turning, so that the frame H can be retained in any desired position. The shaft L is arranged near to the seat D, so that it can be easily operated by the driver. $j\ j$ are the slides in the seed-boxes, and are made of sheet metal or other suitable material. Above the slide is arranged in each seed-box a perforated plate, $k$, in which a number of holes is arranged, which correspond with the holes in the slide, and with those in a plate, $l$, that is directly below the slide. By moving the slide forward and backward, the seed will drop through the holes in $k$ into the holes in the slide $j$, and is then conveyed to the holes in the lower plate $l$, through which it falls to the ground. The seed-box for the cotton-planter only differs from that of the corn-planter by having but one hole in each of the plates $j$, $k$, and $l$, as is clearly shown in fig. 4. On the front end of each slide $j$ are secured upward-projecting lugs, $m$, to which the end of a connecting-rod, O, is pivoted. The shaft G is provided with a number of cranks, $n\ n$, which are in line with the seed-boxes on the frame H, and which correspond to the number of the same. The connecting-rods O are secured to these cranks $n$, and thus as the shaft G is revolved, by means of the pinion $b$ and wheel F reciprocating motion will be imparted to the slides $j\ j$. The pinion $b$ turns loose on the shaft G and is thrown into gear by means of a clutch, B, which is operated by a lever, $o$, as is clearly shown in the drawing. R R are the shovels which open the furrows in front of the seed, and the shovels S cover the seed up in the ordinary manner. The rear of the frame H may be provided with wheels T T by which it is supported, as shown, but if desired these wheels may be omitted.

Having thus described my invention, I claim as new, and desire to secure by Letters Patent—

1. The device for operating the slides $j\ j$ of a seed-planter, consisting of the lugs $m$ on the slides, connecting-rods O, crank-shaft G, pinion $b$, and internal gear on driving-wheel F, all combined with each other, and made and operating substantially as herein shown and described.

2. The device for raising and lowering the hinged frame H, which consists of the chains K passing over the pulley e on the stationary arm N, shaft L, and ratchet-wheel and pawl h i, all made and operating substantially as herein shown and described.

3. The frame H when it is provided with the seeding-boxes, and when it is hinged to the main axle A, substantially in the manner and for the purpose herein shown and described.

D. H. HULL.

Witnesses:
    H. R. BRADLEY,
    EDWARD W. LOWREY.